Jan. 12, 1971 J. GROSS 3,555,456

POWER OSCILLATOR

Filed Feb. 5, 1969 3 Sheets-Sheet 1

INVENTOR.
JENOE GROSS
BY
OSTROLENK, FABER, GERB & SOFFEN
ATTORNEYS

INVENTOR.
JENOE GROSS
BY
OSTROLENK, FABER, GERB & SOFFEN
ATTORNEYS

POWER OSCILLATOR

Filed Feb. 3, 1969 3 Sheets-Sheet 3

INVENTOR.
JENOE GROSS
BY
OSTROLENK, FABER, GROSS & SOFFEN
ATTORNEYS

United States Patent Office 3,555,456
Patented Jan. 12, 1971

3,555,456

POWER OSCILLATOR

Jenoe Gross, Kew Gardens, N.Y., assignor to Solidyne, Inc., Brooklyn, N.Y., a corporation of New York Filed Feb. 3, 1969, Ser. No. 795,866
Int. Cl. H03b *5/18*
U.S. Cl. 331—97 9 Claims

ABSTRACT OF THE DISCLOSURE

A stabilized high frequency power oscillator for heat sealing thermoplastic material is provided with a tank circuit constructed of three concentric conducting tubes. A conducting lower ledge connects the inner and outer tubes at their lower ends, while an upper conducting ledge connects the inner and intermediate tubes at their upper ends. An additional ledge extends inward from the outer tube, partially overlies the upper ledge, and is closely spaced with respect thereto. Fine tuning is achieved by controlling the spacing between the upper ledge and the additional ledge. The power oscillator tube is secured to the upper ledge and extends into the inner tube. The feedback loop in the control grid circuit extends through aligned apertures in the upper and additional ledges into the space between the two innermost tubes. The high voltage lead feeding the plate of the oscillator tube extends through other aligned apertures in the upper and additional ledges, through the space between the two innermost tubes, below the middle tube and outside of the tank, through an opening at the bottom of the outer tube. A plurality of insulators projecting outward from inward depressions in the middle tube rest against the inner surface of the outer tube to maintain the desired spacing between the outer and middle tubes.

This invention relates to stabilized high frequency power oscillators, and more particularly relates to the construction of the oscillator tank.

Typical oscillators used to supply power for the heat sealing of thermoplastic material are required to operate at an assigned frequency of 27.12 mc. plus or minus 0.5% at power levels in the 10 to 20 kw. range. So long as the oscillator operates within the limits of the assigned frequency band, noise radiation is not a problem. Thus, it becomes very important to maintain oscillator operation within such assigned frequency band.

Many prior art power oscillator constructions have had some measure of success in stabilizng frequency. However, more often than not the prior art has permitted oscillator frequency for drift beyond the assigned band and as a consequence was required to provide costly and often awkward devices to suppress radiated noise.

As will hereinafter be seen, the instant invention provides a tank construction which results in high frequency stability, so that elaborate measures to suppress radiated noise are not required. In addition, the tank is so constructed that it supports and positions the power oscillator tube so that the mounting and interconnection of the other oscillator elements is simplified and their operation made more reliable. In particular, there is a direct lead from the power oscillator tube plate through the tank to the high voltage source supplying plate voltage. This is in contrast to prior art constructions in which high voltage for the oscillator plate was supplied through a choke which proved very troublesome.

Accordingly, a primary object of the instant invention is to provide a novel construction for the tank of a frequency stabilized power oscillator.

Another object is to provide a novel construction for a power oscillator tank including three concentric tubes connected together by a pair of annular ledges, and an additional ledge cooperating with one of the tube-connecting ledges to function as a fine tuning means.

Still another object is to provide a power oscillator in which the lead supplying high voltage to the plate of the oscillator tube passes through the oscillator tank for substantially the entire length thereof.

These objects as well as further objects of this invention will become readily apparent after reading the following description of the accompanying drawings in which.

Figure 1:
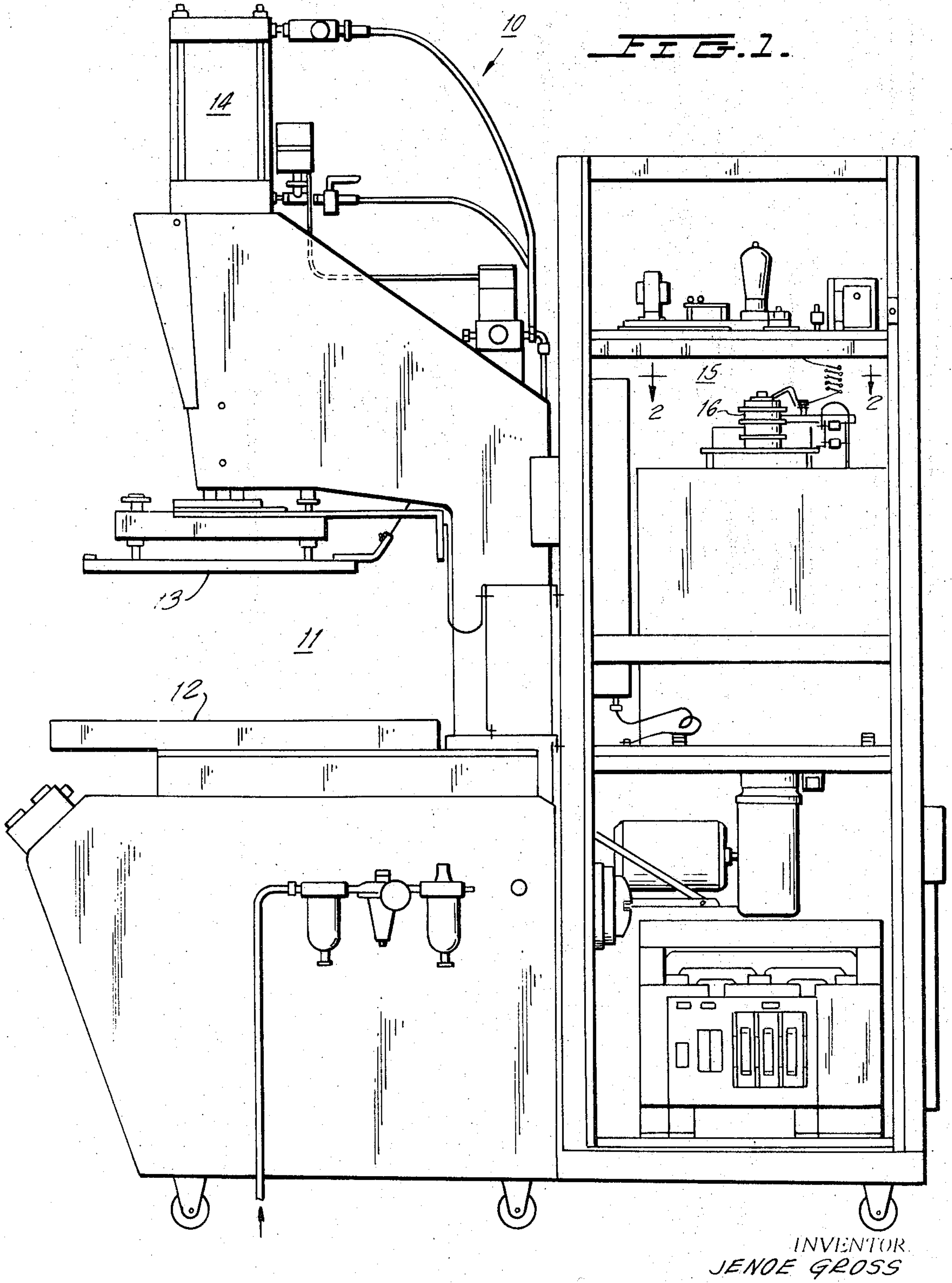
FIG. 1 is a side elevation of heat sealing apparatus, including a frequency stabilized power oscillator constructed in accordance with teachings of the instant invention.
Figure 3:
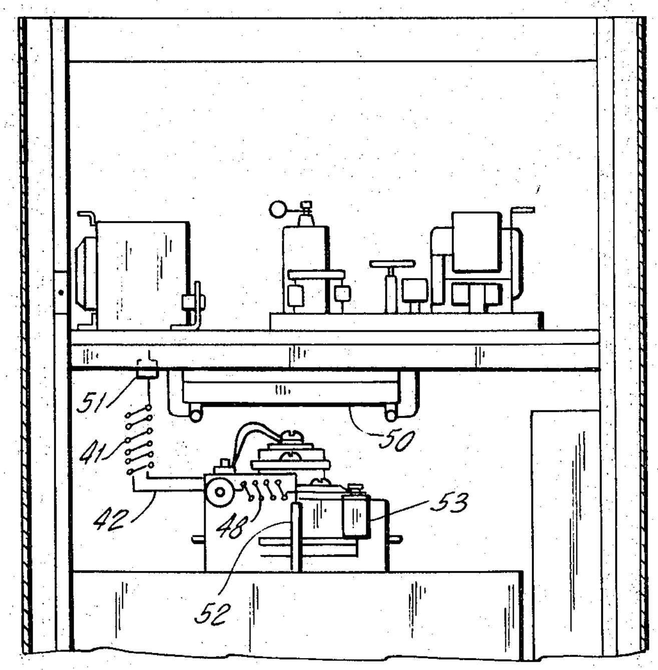
FIG. 3 is a fragmentary side elevation looking in the direction of arrows 3—3 of FIG. 2.
Figure 2:
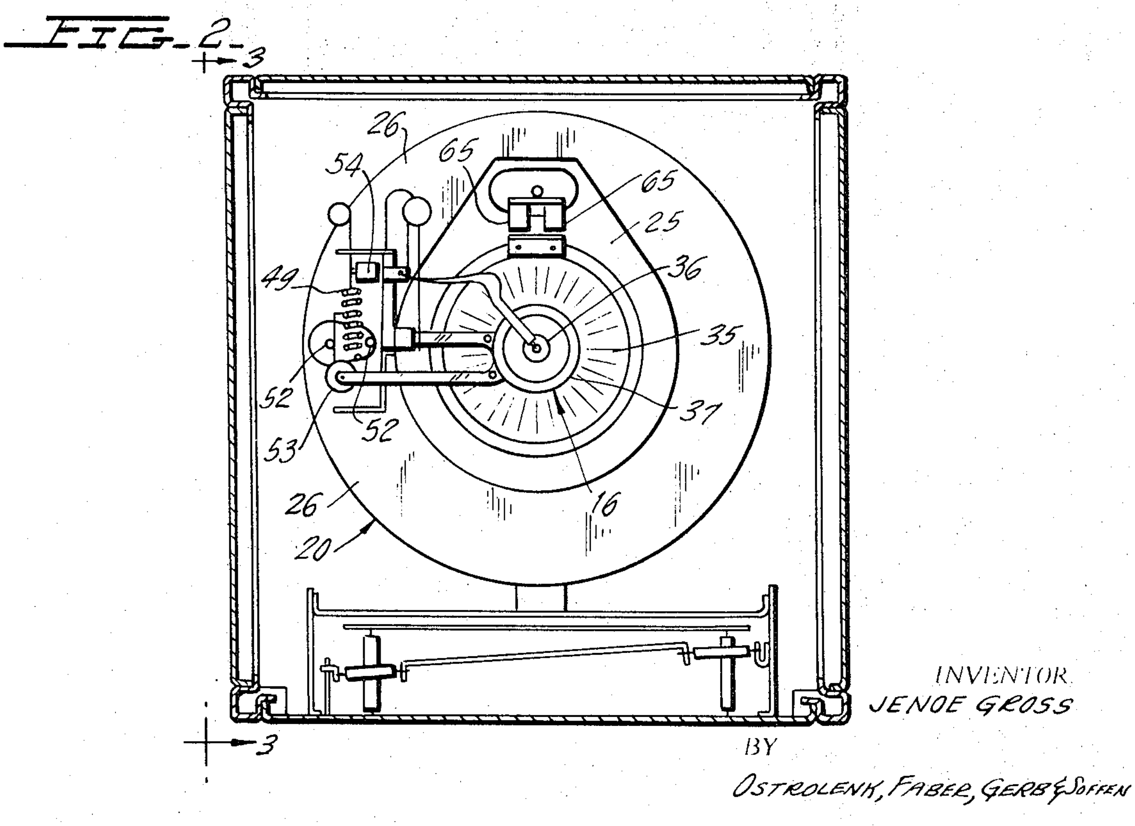
FIG. 2 is a plan view of the oscillator tank and elements mounted thereto, looking in the direction of arrows 2—2 of FIG. 1.

Now referring to the figures, heat sealing apparatus, indicated generally by reference numeral 10 in FIG. 1, includes press section 11 having stationary bed 12 and platen 13 positioned above bed 12. Operation of double acting fluid cylinder 14 is effective to selectively move platen 13 toward and away from bed 12, in a manner well known to the art. High frequency for heat sealing of thermoplastic material is supplied by frequency stabilized power oscillator 15 and applied between platen 13 and bed 12, also in a manner well known to the art.

Oscillator 15 includes tank 20 and power oscillator tube 16. Tank 20 includes three concentric cylindrical tubes 21, 22, 23. Lower annular ledge 24 connects outer and inner tubes 21, 23, together at their lower ends, while upper annular ledge 25 connects middle and inner tubes 22, 23, together at their upper ends, and maintains the lower edge of middle tube 22 at a position slightly above lower ledge 24. Additional annular ledge 26 extends inward from outer tube 21, being slightly above ledge 25 in partial over-lapping relationship. A plurality of screws 27, extending through longitudinal slots 28 at the upper end of outer tube 21 and received by threaded apertures in the upturned lip **26*a* at the outer edge of additional ledge 26, secure ledge 26 to outer tube 21 in a manner such that the longitudinal position of additional ledge 26 may be varied slightly toward and away from upper ledge 25** for the purpose of oscillator fine tuning.

Spacing between the outer and middle tubes 21, 22 is maintained by a plurality (typically 12) of insulators 29. The mounting of each insulator 29 is shown in detail in FIG. 5. More particularly, forward end **29*a* of insulator 29 rests against inner surface 21*a* of outer tube 21 while the rear of insulator 29 extends to the bottom of inward depression 30 of inner tube 22. Central aperture 31 at the bottom of depression 30 receives rearward projection 29*b* of insulator 29** to stabilize the position of the latter.

It is noted that each of the tubes 21, 22, 23 as well as each of the ledges 24, 25, 26 is constructed of material having superior electrical conducting properties. While no particular means have been shown for connecting tubes 21, 22, 23 and ledges 24, 25, it should now be apparent to those skilled in the art that these elements may be joined by soldering, angles may be added to provide bridges for screw type connections, or the elements may be provided with lips that overlie adjacent elements and receive fastening screws in a manner similar in which additional ledge 26 is secured to outer tube 21 at its upper end.

Ring 32 is mounted at the upper ends of a plurality of insulating rods 33 which extend upwardly from ledge 25 and have their lower ends secured to ledge 25. The outer ends of tabs 34 extending radially outward from cooling fin assembly 35 of power oscillator tube 16 are screw connected to ring 32. Central pad 36 and ring 37, both at the upper end of tube 16, constitute filament terminals, while ring 38 constitutes a control grid terminal and ring 39 constitutes a plate terminal.

Figures 4, 5, 6, 7:
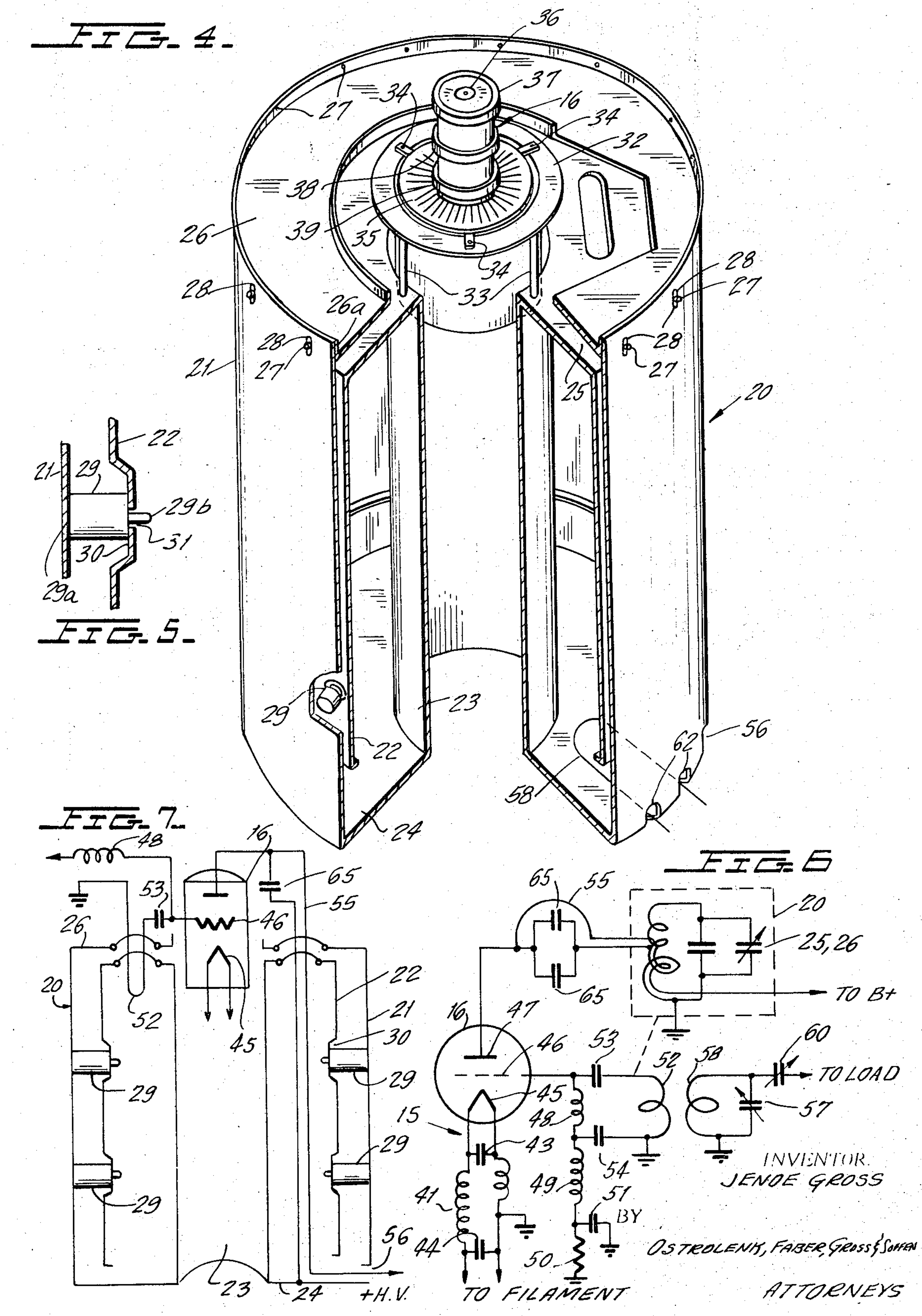
FIG. 4 is a perspective of the oscillator tank and power oscillator tube, with portions of the tank cut away to reveal its internal construction.
FIG. 5 is a fragmentary side elevation showing one of the plurality of insulators for maintaining the spacing between the two outermost tubes of the tank.
FIG. 6 is an electrical schematic of the oscillator circuit portion of the apparatus of FIG. 1.
FIG. 7 is a schematic representation of the tank of FIG. 4 and certain of the elements of FIG. 6.

Now referring more particularly to FIG. 6, it is seen that one of the leads of power oscillator filament 45 is connected through filter choke 41 to the filament power source, while the other lead of filament 45 is connected through harmonic trap choke 42 to the filament power source. Filter capacitor 43 extends directly across filament 45 while filter capacitor 44 is connected to the ends of chokes 41, 42, remote from filament 45. Power oscillator control grid 46 is connected through the series combination of filter chokes 48, 49 and resistor 50 to ground. Filter capacitor 51 parallels resistor 50. Grid 46 is also connected to ground through the series combination of capacitor 53 and feedback loop or coupling coil 52 with capacitor 53 being at the end of such combination nearer to grid 46. As seen in FIG. 7, grid coupler 52 extends through aligned apertures in ledges 25, 26 into the space between tank tubes 22, 23. Another filter capacitor 54 is connected from the juncture between coils 48, 49 to ground.

Insulation covered lead 55 extends directly from oscillator tube plate 47 to the high voltage source energizing oscillator tube 16. In particular, as seen in FIG. 7, lead 55 extends from plate 47 downward through aligned openings in ledges 25, 26, in a longitudinal direction, through the length of tank 20 in the space between middle and inner tubes 22, 23, passes beneath the lower end of middle tube 22, and outside of tank 20 through opening 56 at the bottom of outer tube 21. Capacitor 65 is connected to plate electrode 47 and extends through the tank for the length thereof terminating at lower ledge 24.

Power take-off loop 58, positioned in a plane parallel to lower ledge 24 and extending beneath middle tube 21, extends outside of tank 20 through apertures 61, 62, at the lower end of outside tube 21. One end of loop 58 is grounded and the other end thereof extends through variable coupling capacitor 60 to the load, which in this case is movable platen 13.

Thus, it is seen that the instant invention provides a novel construction for the tank of a stabilized high frequency power oscillator. With such construction, frequency drift is maintained within acceptable limits, thereby obviating the necessity of having sophisticated and/or costly means for suppressing radiated noise.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. In a frequency stabilized oscillator system, a tank circuit including first, second and third coaxial conducting tubes positioned in spaced relationship with said second tube disposed between said first and said third tubes; a conducting lower ledge connecting said first and said third tubes at their lower ends; a conducting upper ledge connecting said second and said third tubes at their upper ends; said second tube having its lower end above said lower ledge in relatively close spaced relationship with respect thereto; another conducting ledge extending from said first tube inward and above said upper ledge in relatively close spaced relationship with respect thereto.

2. An oscillator system, as set forth in claim 1, in which there is a power oscillator and insulating means mounting said power oscillator to said upper ledge.

3. An oscillator system as set forth in claim 2, in which a portion of said power oscillator extends below said upper ridge and another portion of said power oscillator extends above said another ledge.

4. An oscillator system as set forth in claim 2, in which the power oscillator includes a control electrode and a power electrode; an insulated high voltage lead extending from said power electrode through openings in said upper and other ledges into the space between said second and said third tubes and passing beneath said second tube and outside of said first tube through an opening at the lower end thereof.

5. An oscillator system as set forth in claim 4, in which there is a feedback coupling means operatively connected to said control electrode and extending through additional openings in said additional and upper ledges into the space between said second and third tubes.

6. An oscillator system as set forth in claim 1, in which fine tuning of said tank circuit is obtained by controlling spacing between said additional and upper ledges.

7. An oscillator system as set forth in claim 1, in which there are a plurality of insulators spacing said first and said second tubes from each other, an individual inward depression in said second tube for each of said insulators, each of said insulators having a rear protuberance, each of said depressions having a formation to receive and cooperate with an insulator rear protuberance to operatively position said insulators with their front ends adjacent the inner surface of said first tube.

8. An oscillator system, as set forth in claim 1, in which spacing between said second and third tubes exceed twice the spacing between said first and second tubes.

9. An oscillator as set forth in claim 1, in which said tubes are cylindrical and said ledges are annular.

No references cited.

JOHN KOMINSKI, Primary Examiner

U.S. Cl. X.R.

331—96